Patented Dec. 22, 1953

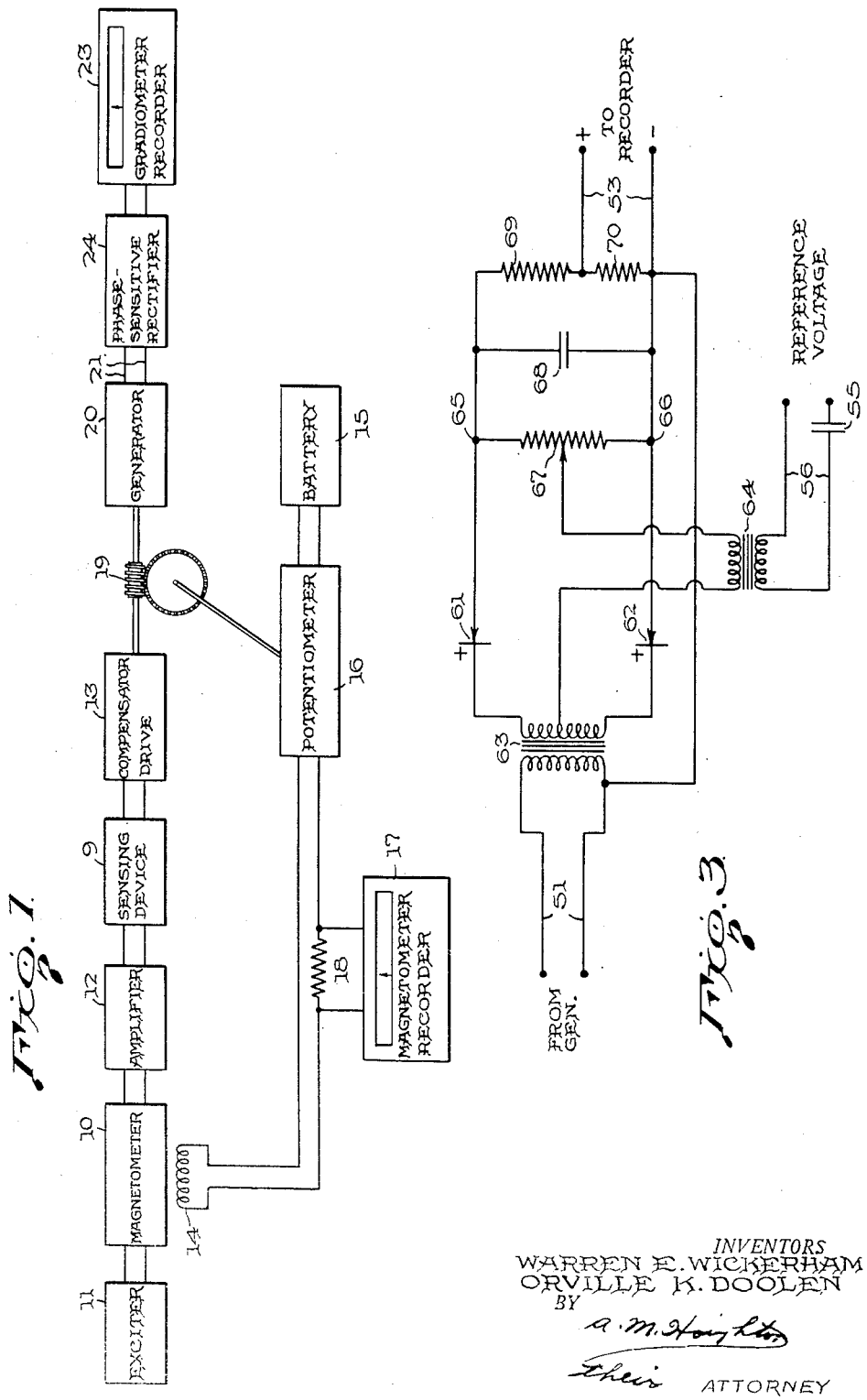

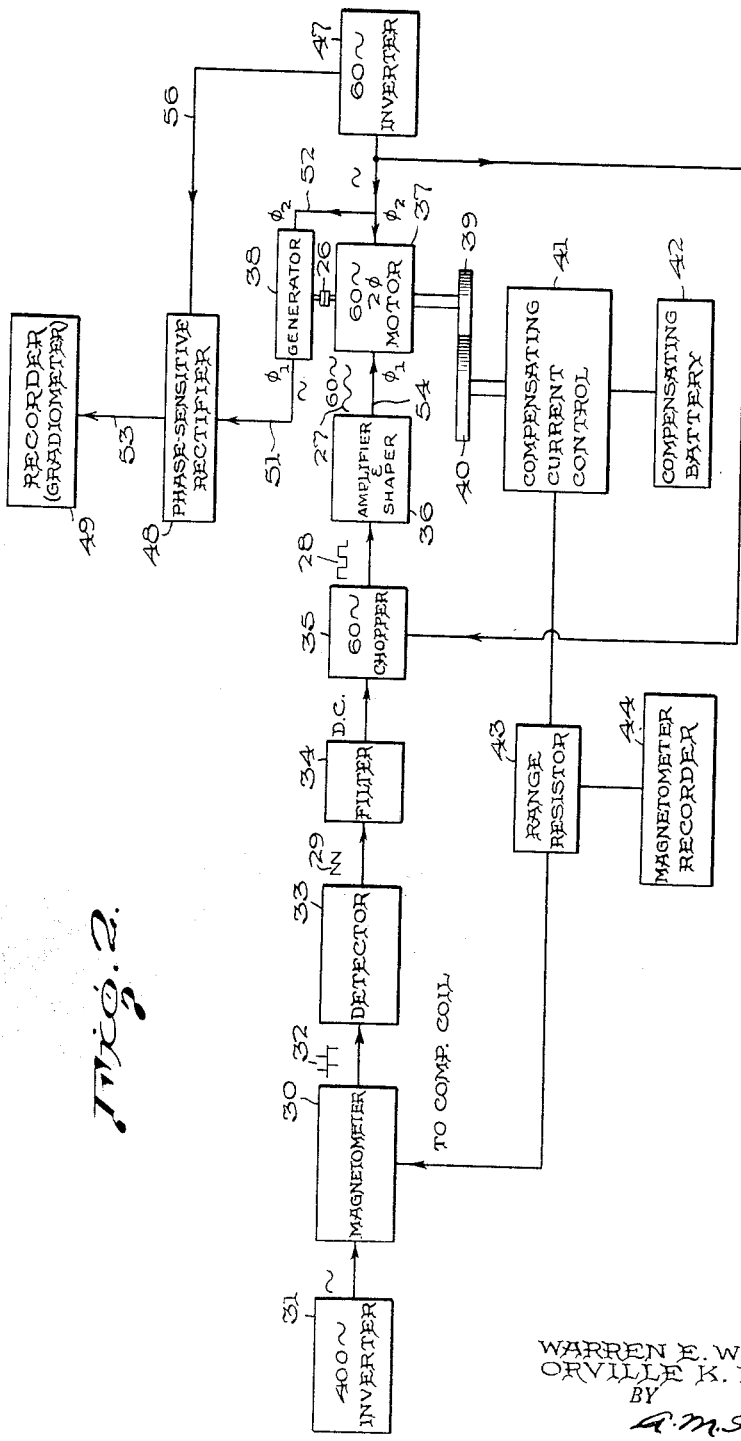

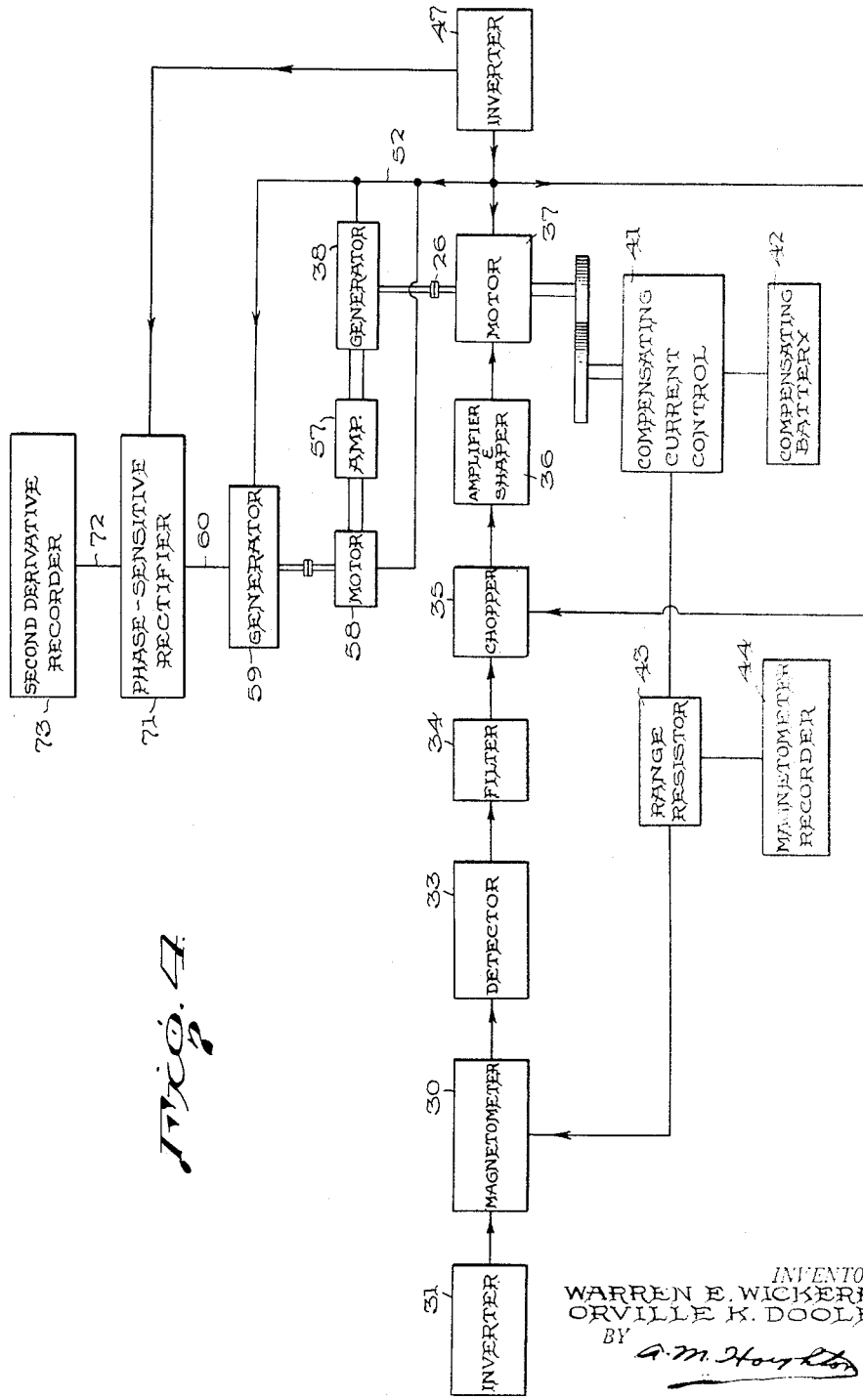

UNITED STATES PATENT OFFICE 2,663,843

MAGNETIC GRADIOMETER

Warren E. Wickerham, Penn Township, Allegheny County, and Orville K. Doolen, Oakmont, Pa., assignors to Gulf Research & Development Company, Pittsburgh, Pa., a corporation of Delaware Application August 3, 1950, Serial No. 177,424

3 Claims. (Cl. 324—43)

This invention relates to a magnetic space gradiometer and in particular concerns a magnetic gradiometer which is advantageously used in conjunction with an airborne magnetometer such as is employed in magnetic-prospecting operations.

In prospecting for minerals, petroleum and the like, it has long been customary to measure various parameters of the earth's magnetic field over the area being investigated. From these measurements geophysicists have been able to infer the nature of the underlying rock formation or deposits with the ultimate aim of locating valuable minerals or possible petroleum-bearing rock formations. Of the various types of magnetic measurements heretofore made, the most extensively employed has been the vertical magnetic component measured with the so-called Schmidt-type vertical balance. This device necessitates the use of a fixed support for taking a measurement. More recently, various types of airborne magnetometers have been developed to a high degree of perfection and it has been possible to magnetically map large areas which were previously inaccessible and such airborne magnetic surveying may be done with great rapidity. Other types of magnetic measurements have been proposed and made for prospecting purposes, one of these being the space gradient of the magnetic field or some component thereof. In certain types of geological areas such magnetic-gradient maps yield particularly useful results in that the maps show indications of mineral deposits, which indications may be obscure on other types of maps. Magnetic-gradient maps are particularly useful for finding magnetic-anomalies of relatively small dimension and these often may contain magnetic minerals of substantial commercial value.

Heretofore measurement of the magnetic gradient has required the use of a two-element gradiometer, the elements of which have a spacial separation and are connected electrically in opposition in an appropriate manner so that the combined output is a difference signal. Two important difficulties arise when such a two-element gradiometer is used in an airplane. If the elements are located close together, the magnetic difference between their two locations is very small, and it becomes impossible to attain sufficient sensitivity in the apparatus to measure the terrestrial magnetic gradient with precision. On the other hand, if the elements are spaced apart as far as possible on an airplane, such, for example, as on the wing tips, the lack of rigidity of the airplane structure causes difficulties in maintaining the two elements in fixed configuration and vibration of the structure gives rise to spurious signals. Both of these difficulties are overcome by our invention which employs but a single magnetic-detecting element.

It is an object of this invention to provide a magnetic space gradiometer which is particularly useful in airborne magnetic prospecting.

It is another object of this invention to provide a magnetic space gradiometer which may be conveniently used in conjunction with an airborne magnetometer for rapidly prospecting an area.

It is a further object of this invention to provide auxiliary means for use in connection with a total-field type of airborne magnetometer, which means records the time derivative or time-rate-of-change of magnetic intensity wherefrom the space gradient of magnetic intensity may readily be computed.

It is a still further object of this invention to provide a simple means for use in conjunction with an airborne magnetometer whereby any desired time derivative of the magnetic intensity may be measured wherefrom the desired order of space gradient may readily be computed.

These and other useful objects of our invention are attained in the manner disclosed in the following specification of which the drawings form a part, and in which:

Figure 1 is a block diagram of one form of the invention when used in conjunction with a total-field magnetometer;

Figure 2 is a block diagram of another embodiment of the invention;

Figure 3 is a wiring diagram of one form of a phase-sensitive rectifier which may be employed in connection with Figure 2; and Figure 4 is a block diagram of an embodiment of the invention whereby higher order of derivatives may be obtained.

In most airborne-magnetometer surveys, it is usual to stabilize the magnetometer element in such a way that it measures the total terrestrial magnetic-field vector. The output of the magnetometer is recorded as it is flown over the area along substantially regularly-spaced flight lines. The pattern of the flight lines may be rectangular or circular or hyperbolic, depending on the type of position control which is being employed by the flight navigator. In all cases the position of the plane is accurately correlated with the magnetic record. From these data it is therefore possible to obtain the location over the ground and also the ground speed of the airplane at all times during the survey.

For recording the magnetic intensity observed along the flight line, an apparatus is provided on the airplane which will respond rapidly so that the recorder will accurately give a true picture of the magnetometer output signal as the latter traverses the area. Such a rapid response is particularly necessary in areas where the observed magnetic intensity changes rapidly from place to place, as is the case in geological areas likely to contain iron ores or other highly magnetic rocks.

It is also in such areas that the magnetic gradient method is most useful.

The precision required in magnetic prospecting necessitates that the recording scale be greatly expanded for recording the magnetic intensity. Experience in areas containing highly magnetic rocks has shown that large intensity variations may occur which cause the recording mechanism to rapidly traverse its scale, whereupon an automatic mechanism is provided to cause the recorder to continue its record after stepping to the other side of the scale. Such unavoidable discontinuities tend to confuse the interpretation of the records. These discontinuities are eliminated from the magnetic gradient record when made by our invention, thus greatly simplifying the interpretation of the magnetic data. Our invention provides a simple manner of obtaining a continuous magnetic gradient record in conjunction with the operation of a recording magnetometer even though the latter gives a discontinuous record because of frequent recorder steps.

In referring to Figure 1 there is shown a simplified block diagram of the various component parts of a magnetometer, such as is customarily used in making airborne magnetic measurements. The magnetometer instrument itself is designated by the block 10 and may comprise one or more flux valves (not shown) such as are customarily used in airborne magnetometers. The flux valves may be excited by means of exciter 11 electrically connected thereto. Several exciters may be employed in some magnetometers, each exciter being connected respectively to one of the flux valves in the magnetometer unit 10. The output signal from the magnetometer 10 representing the desired magnetic intensity measurement is fed into an amplifier 12 whose output is detected in sensing device 9. The sensing device 9 serves to detect changes of signal either side of a predetermined operating level, and its output may be biased in known manner so as to give discrimination between increasing and decreasing signals. The output of amplifier 12 is delivered to a compensator drive unit 13 which comprises a means for converting the output of amplifier 12 into mechanical movement and may conveniently be a reversible electric motor or other form of electromechanical transducer. In order to operate the magnetometer at maximum sensitivity, almost all of the ambient field to which the magnetometer 10 is subjected is nullified by current in a nulling coil 14. This coil may conveniently be located on the measuring flux valve of magnetometer 10 but for simplicity is shown in Figure 1 as a separate coil 14. The nulling current in coil 14 is supplied from compensator battery 15 and is maintained under the control of the compensator drive 13. The compensator drive motor 13 may drive the shaft of a potentiometer 16 through mechanical drive 19. Accordingly, the nulling current is supplied from compensator battery 15 through the adjustable potentiometer 16. Potentiometer 16 may comprise a long slide-wire resistor or other form of current-regulating mechanism for regulating the current supplied to the nulling coil 14. The current which is supplied to nulling coil 14 may be recorded by a recorder 17 which may be a recording ammeter. Alternatively, the current may be fed through a precision resistor 18 and the resulting voltage drop across the resistor may be recorded by a recorder 17 of the potentiometric type.

Thus, the magnetometer 10 operates substantially continually in zero field, or at some fixed small bias field as is well known in the art, and whenever the output of amplifier 12 falls above or below this fixed value the compensator drive rotates clockwise or counterclockwise so as to control the setting of potentiometer 16 to maintain proper nulling current, this nulling current being recorded on recorder 17 to afford a permanent and continuous record of the magnetic field experienced by magnetometer 10.

Mechanically coupled to the compensator motor 13, either directly or through the gearing 19, is an electromagnetic generator 20 having output leads 21.

It is apparent that the voltage across leads 21 is proportional to the velocity of the compensator-drive motor and since the motor is mechanically coupled to the potentiometer 16 this velocity signal in leads 21 is directly proportional to the time rate at which the potentiometer 16 adjusts the nulling current. Therefore, the potential across leads 21 is proportional to the time-rate-of-change of nulling current, i. e., it is proportional to the time-rate-of-change of magnetic intensity.

Generator 20 may be either D.-C. or A.-C. If of the D.-C. type, the sense of the rate-of-change is determined by the polarity of the voltage on leads 21. If of the A.-C. type, the sense of the rate-of-change is determined by the phase, which may be detected by means of a phase-sensitive rectifier 24. As shown in Figure 1, a potentiometric recorder 23 may be connected to the output of the phase-sensitive rectifier 24 and such a recorder will produce a record of the time-rate-of-change of nulling current, i. e., the time-rate-of-change of magnetic intensity to which the magnetometer 10 is subjected. If generator 20 is of the D.-C. type, the unit 24 may be dispensed with and the recorder 23 may be connected directly to the leads 21. The recorder 23 may conveniently be a zero-center recorder so that both increase and decrease of magnetic intensity may be recorded.

When the apparatus of Figure 1 is mounted in an airplane and flown over a regular flight pattern, the airplane speed is usually maintained at a fixed known value. Inasmuch as the position of the airplane must be accurately determined at frequent intervals in order to correlate the record of magnetometer recorder 17 with ground position, the ground speed of the airplane will also at all time be accurately known. In any event, the airplane ground speed may be easily determined from the various factors affecting flight, e. g., air speed, wind, etc. The record of time-rate-of-change recorder 23 may therefore be readily converted into space gradient of magnetic intensity along the flight line by simply dividing the recorded time-rate-of-change by the ground speed. Thus the space gradient in gamma per mile is the time-rate-of-change in gamma per minute divided by the ground speed in miles per minute. In flying a total-field magnetometer along a rectangular grid the recorded space gradient will be the derivative of total magnetic intensity, said derivative being taken along the direction of the flight line.

Recorder 23 thus produces a record of magnetic gradient directly from the observed magnetometer operations without the necessity of making further computations on the total-field record. The record is identical to that which would be obtained from a two-element gradiometer of extreme and heretofore unattainable sensitivity. The records of recorder 17 and 23 taken together represent the magnetic intensity and the space gradient of magnetic intensity along the flight line. By properly choosing the direction of flight lines with respect to the general geological strike of the area, the gradient record from recorder 23 will very markedly show the location of magnetic anomalies, and taken together with the magnetic intensity record from recorder 17 will afford a powerful tool for the determination of depth and size of rock structures which produce the observed anomalies.

Figure 2 shows a more detailed block diagram of a preferred form of our invention. The magnetometer 30 may be excited from exciter 31 which may conveniently be an inverter comprising a 400-cycle generator driven from D.-C. power available on the airplane. The magnetometer 30 may contain one or more flux valves of known type which are excited by one or more separate generators in the unit 31. The output signal of magnetometer 30 may in one form consist of a series of sharp voltage pulses or spikes pictured at 32 (Figure 2) as fully described in Vacquier U. S. Patent No. 2,406,870. These are fed into detector unit 33 which is sensitive to the amplitudes of the pulses and which produces a fluctuating D.-C. output (pictured at 29) in response thereto. Filter 34 smooths this out to a steady D.-C. signal. This D.-C. is converted to square waves (pictured at 28) of 60-cycle A.-C. of predetermined phase by means of a 60-cycle chopper 35. Chopper 35 may conveniently be a vibrator which is driven by and in synchronism with the inverter 47. Since inverter 47 also feeds other parts of the apparatus, there is a definite phase relationship between the output signal 28 from chopper 35 and the voltages in other parts of the apparatus.

Detector circuit 33 may be of any type which will give either plus or minus output upon deviation, in one direction or the other, of the field at element 30 from some predetermined value which is preferably zero field. Thus, the output of chopper 35 will become zero and reverse polarity as the field passes through this zero value. To maintain the field at or very near zero at the magnetometer element 30 when the element is placed in the earth's field, it is necessary to buck out or compensate the earth's field by means of a D.-C. current fed into a compensating coil (not shown in Figure 2) wound around the measuring flux-valve element. This current is automatically and continuously adjusted to match the earth's field by means of elements numbered 36, 37, 38, 40, 41, and 42. The compensating current is D.-C. supplied from battery 42 metered out to the desired value by means of a long-range potentiometer 41. This potentiometer may conveniently be a multi-turn type of potentiometer, for example, one having a range of 40 turns between maximum and minimum current, and may be driven by motor 37 through friction drive wheels 39 and 40. Motor 37 is a two-phase motor, one phase of which is always excited from inverter 47. Its other phase is excited only as required by the output of chopper 35, after amplification and conversion in unit 36 to sinusoidal wave form as pictured at 27 (Figure 2). Since the direction of rotation of a 2-phase motor depends on the phase sequence of the two windings, reversal of the chopper output phase will reverse the motor rotation.

The above-described system operates so that departure of the magnetic field at element 30 in either sense from the desired value will start the motor 37 rotating in the direction necessary to readjust the compensating current and bring the magnetic field at element 30 back to the desired value of zero. Thus, the magnetometer acts as a null device, and the compensating current can be used as a measure of the magnetic field at the magnetometer 30. Recorder 44 is used to measure the compensating current and can be calibrated in magnetic intensity units by choosing a resistor 43 which will produce the correct potential difference to deflect the recorder a desired distance for a certain value of magnetic field and compensating current. The recorder 44 is conveniently of the potentiometer type.

A two-phase induction generator 38 is mechanically coupled to motor 37 as for example by coupling 26, and delivers its output to leads 51. One winding of the generator 38 is fed through leads 52 with the supply voltage of inverter 47 of fixed phase. Therefore, the other winding of the generator 38 produces an output signal which reverses phase whenever the direction of rotation of the generator 38, i. e., motor 37, is reversed. Furthermore, the output of the induction generator 38 has its phase and amplitude determined by its direction of rotation and angular velocity. As a consequence, the output of this generator contains information directly related to the magnitude and sign of the time-rate-of-change of the magnetic field. This information is reduced to usable form by feeding the generator output into a phase-sensitive rectifier 48 to be more fully described later. Thus, the information appears in lead 53 as D.-C. whose polarity and magnitude depend on the direction and angular velocity of the generator's rotation. This voltage is suitable to be fed into a zero-center potentiometric recorder 49.

The generator output at leads 51, proportional to its speed of rotation, may be used to indicate the time-rate-of-change of the signal output 54 from amplifier 36. In order to indicate whether this time-rate-of-change is positive or negative, a phase-sensitive rectifier circuit may be used. One type of such a phase-sensitive rectifier circuit is shown in detail in Figure 3, which corresponds to unit 48 of Figure 2 or unit 24 of Figure 1. In the circuit of Figure 3, two diodes 61 and 62 convert the 60-cycle A.-C. from leads 51 (Figure 2) into D.-C. which can be fed to the gradient recorder 49 (Figure 2). Diodes 61 and 62 may be of type 1-N-34 crystal rectifiers or of type 6-H-6 vacuum tube rectifiers or other equivalent types. Two components of A.-C. are fed to the rectifiers. The generator output component from leads 51 (Figures 2 and 3) which is to be indicated, is fed through transformer 63 (Figure 3). The reference voltage from the 60-cycle inverter 47 is fed through leads 56 (Figures 2 and 3) to transformer 64. Condenser 55 is inserted in leads 56 (Figure 3) in order to properly phase the reference voltage supplied to transformer 64. It may be seen from Figure 3 that either of the voltages from 51 or 56 alone is fed equally to the two rectifiers 61 and 62, and that the rectifier outputs are in opposition. Hence, neither of the A.-C. inputs 51 or 56 alone can produce D.-C. output. However, if both A.-C. inputs are applied simultaneously, the A.-C. peak values will combine additively at one rectifier and combine subtractively at the other rectifier, so that a net D.-C. value appears across the terminals 65 and 66. If the input 51, delivered from generator 38, (Figure 2) reverses in phase, addition will occur on the opposite rectifier and the D.-C. output polarity of terminals 65 and 66 will reverse.

While Figure 3 shows an electronic type of phase-sensitive rectifier, the same result may be accomplished by the use of a mechanical synchronous rectifier which is driven synchronously with the A.-C. from inverter 47 of Figure 2. Phase-sensitive rectification may then be obtained since one phase of generator 38 is excited from (synchronously) inverter 47 as previously mentioned.

A zero-center recorder 49 (Figure 2) is preferred because plus and minus values are to be recorded. Potentiometer 67 (Figure 3) may be adjusted to compensate for slight differences between rectifiers 61 and 62 or to compensate for any differential drift between them. Condenser 68 removes the A.-C. ripple from the D.-C. output of the rectifiers. The voltage delivered between terminals 65 and 66 may be voltage-divided as by resistors 69 and 70 to suit a sensitive potentiometric recorder 49 of well-known type. Leads 53 (Figures 2 and 3) are accordingly connected to such a potentiometric recorder 49 (Figure 2).

The output of this instrument is sufficiently linear to allow quantitative calibration in gamma per minute, which in turn may be reduced to gamma per mile or other unit of distance in the manner previously explained.

Figure 4 shows a block diagram of a form of our invention by means of which higher order derivatives of the magnetic intensity may be directly measured. Apparatus for obtaining directly such higher order derivatives of the magnetometer record has heretofore not been available. Figure 4 is similar in many respects to Figure 2 and those units bearing similar reference numerals perform similar functions in Figures 2 and 4. In Figure 4 the output of generator 38 may be fed into a phase-sensitive rectifier and recorder if desired to obtain the first time derivative as in Figure 2, but in order to obtain a second order derivative, the output of generator 38 (Figure 4) is fed into an amplifier 57 whose output may drive a motor 58. By coupling the motor 58 to a second generator 59 which is in all respects similar to 38 a signal output is obtained on leads 60 which is related to the motion of motor 58 in exactly the same way that the output of generator 38 is related to the motion of motor 37, namely, a time derivative. Generator 59 may have one phase excited from inverter 47 as in generator 38. Thus the D.-C. output signal 72 delivered by the phase-sensitive rectifier 71 is representative of the second time derivative of the magnetic intensity recorded by recorder 44. This second derivative may be recorded on recorder 73.

Inasmuch as recorder 73 gives the second time derivative, it is necessary to divide the recorded numerical value by the ground speed squared in order to obtain the second space derivative of the magnetic intensity.

It is apparent that the apparatus of Figure 4 may be further expanded to obtain higher order derivatives if such are desired. These derivatives are thus recorded directly without the necessity of making any differential computation from the recorded data. The higher order derivatives may be recorded either with or without recording the lower derivatives.

The records of recorder 23 of Figure 1, 49 of Figure 2, and 73 of Figure 4 may respectively be synchronized with the records of recorder 17 of Figure 1, 44 of Figure 2 and 44 of Figure 4 in conventional manner by operating the respective tape drives by means of synchronous motors, clocks or other well-known devices. Alternatively, fiducial marks may simultaneously be placed on the corresponding records in order that corresponding points may be located on the total intensity and gradient records. These or other auxiliary fiducial marks may also be used to indicate on the records the position of the airplane over the survey area, such fiducial marks being simultaneously impressed on the strip map or other position-determining record in well-known manner.

What we claim as our invention is:

1. Apparatus for measuring the time-rate-of-change of magnetic intensity comprising detecting means sensitive to an intensity value of a magnetic field, electromechanical transducing means electrically connected to the output of said detecting means, means for compensating the major portion of said magnetic field, said compensating means being controlled by said electromechanical transducer, an electromagnetic generator mechanically coupled to said transducer, and means electrically connected to said generator indicating the electrical output thereof.

2. Apparatus for measuring the time-rate-of-change of magnetic intensity comprising detecting means sensitive to an intensity value of a magnetic field, electrical transducing means connected to the output of said detecting means for transforming the output thereof into an alternating-current signal whose phase and amplitude are indicative of the output of said detector, an alternating-current two-phase motor having one phase connected to said electrical transducer and the other phase connected to a synchronous alternating-current supply of fixed phase, means for compensating substantially all of the magnetic field at said detecting means, said compensating means being controlled by said motor, an alternating-current two-phase induction generator mechanically coupled to said motor and having one phase excited by said alternating-current supply of fixed phase, phase-sensitive rectifier means electrically connected to the output of said generator, means connecting said phase-sensitive rectifier means to said alternating-current supply of fixed phase, and means electrically connected to said phase-sensitive rectifier indicating the electrical output thereof.

3. Apparatus for measuring the time-rate-of-change of magnetic intensity comprising detecting means sensitive to an intensity value of a magnetic field, electromechanical transducing means electrically connected to the output of said detecting means, means for compensating a proportional part of said magnetic field, said compensating means being controlled by said electromechanical transducer, an electromagnetic generator mechanically coupled to said transducer, and means electrically connected to said generator indicating the electrical output thereof.

WARREN E. WICKERHAM.
ORVILLE K. DOOLEN.

References Cited in the file of this patent

UNITED STATES PATENTS

| Number | Name | Date |
| --- | --- | --- |
| 2,406,870 | Vacquier | Sept. 3, 1946 |